(12) United States Patent
Kluge

(10) Patent No.: US 8,849,517 B2
(45) Date of Patent: Sep. 30, 2014

(54) DETECTING A HANDS FREE DRIVING SITUATION OF A MOTOR VEHICLE

(75) Inventor: Torsten Kluge, Overath (DE)

(73) Assignee: Ford Global Technologies, Dearborn, MI (US)

( * ) Notice: Subject to any disclaimer, the term of this patent is extended or adjusted under 35 U.S.C. 154(b) by 80 days.

(21) Appl. No.: 13/353,536

(22) Filed: Jan. 19, 2012

(65) Prior Publication Data

US 2012/0191266 A1  Jul. 26, 2012

(30) Foreign Application Priority Data

Jan. 21, 2011  (DE) .......... 10 2011 002 997

(51) Int. Cl.
*B62D 6/00* (2006.01)
*B62D 15/02* (2006.01)
*B60W 40/09* (2012.01)
*B60W 30/10* (2006.01)
*B60W 30/12* (2006.01)

(52) U.S. Cl.
CPC ........ *B62D 15/025* (2013.01); *B60W 2510/202* (2013.01); *B60W 2540/18* (2013.01); *B60W 30/10* (2013.01); *B60W 40/09* (2013.01); *B60W 30/12* (2013.01)
USPC .................. 701/43; 701/41; 701/36; 701/42; 307/10.1; 180/404

(58) Field of Classification Search
None
See application file for complete search history.

(56) References Cited

U.S. PATENT DOCUMENTS

| 7,568,551 | B2* | 8/2009 | Satake | 180/446 |
| 8,406,956 | B2* | 3/2013 | Wey et al. | 701/41 |
| 2007/0233344 | A1* | 10/2007 | Satake | 701/41 |
| 2008/0255727 | A1* | 10/2008 | Lee | 701/41 |
| 2008/0306655 | A1* | 12/2008 | Ukai et al. | 701/42 |
| 2010/0152952 | A1* | 6/2010 | Lee et al. | 701/29 |
| 2010/0235051 | A1* | 9/2010 | Kariatsumari et al. | 701/41 |
| 2011/0032119 | A1* | 2/2011 | Pfeiffer et al. | 340/905 |

* cited by examiner

*Primary Examiner* — Tuan C. To
*Assistant Examiner* — Paul Castro
(74) *Attorney, Agent, or Firm* — Angela M. Brunetti; Raymond Coppiellie

(57) ABSTRACT

Embodiments of the inventive subject matter ensure that a hands-free driving situation of a motor vehicle can be detected. In the case of such detection of a hands-free driving situation, requirements of a driving assistance system are preferably reset with respect to steering corrections made by the driving assistance systems. In this manner, virtually independent steering of the vehicle such as, for example, and autopilot type of driving assistance functionality is therefore advantageously avoided.

15 Claims, 1 Drawing Sheet

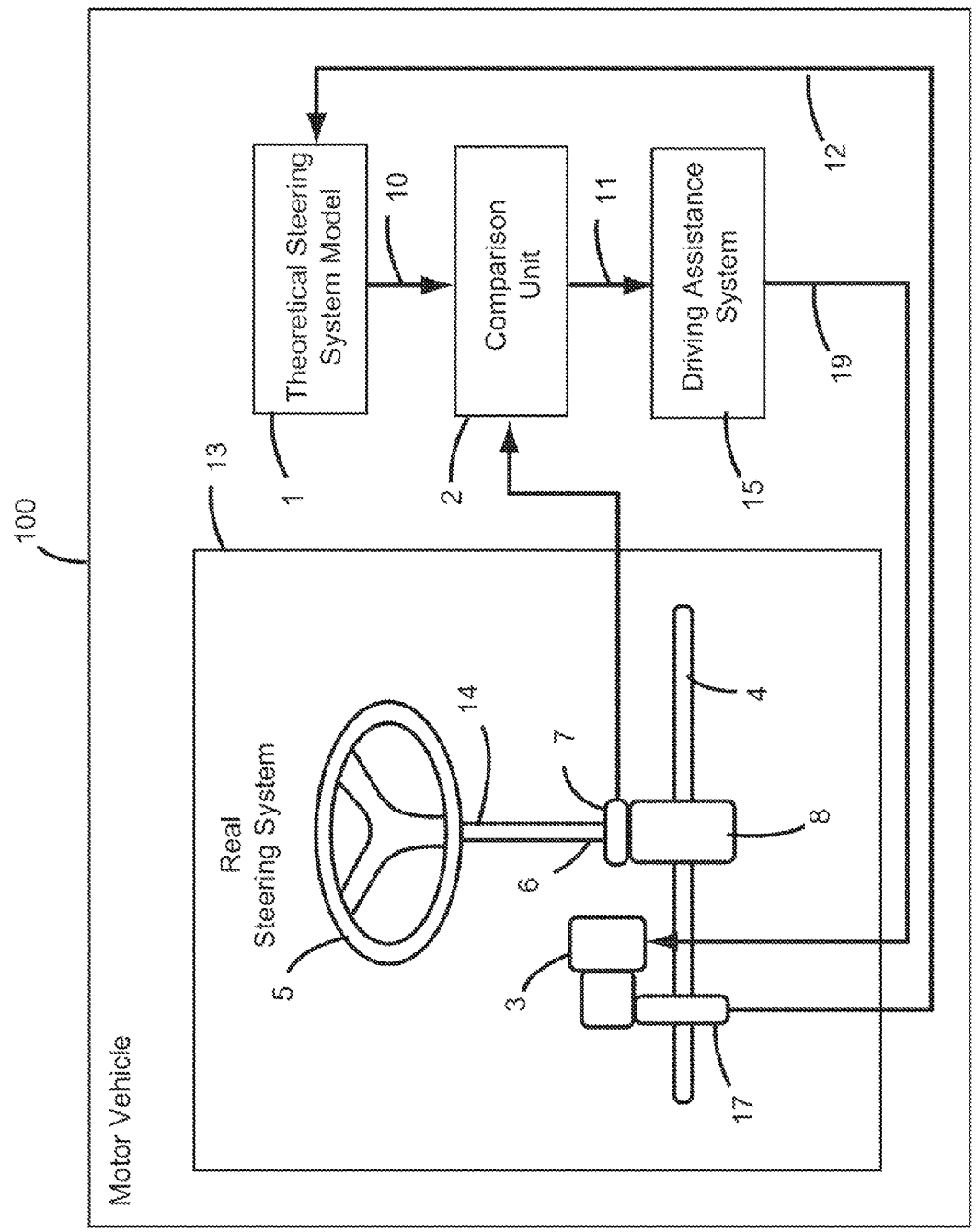

DETECTING A HANDS FREE DRIVING SITUATION OF A MOTOR VEHICLE

CROSS-REFERENCE

The inventive subject matter is a continuation of German Patent Application No. DE 102011002997.4, filed Jan. 21, 2011 entitled "Method For Detecting A Hands-Free Driving Situation Of A Motor Vehicle", the entire disclosure of which is hereby incorporated by reference into the present disclosure and provides the basis for a claim of priority of invention under 35 U.S.C. §119.

FIELD OF THE DISCLOSURE

The disclosures made herein relate generally to driving assistance systems and functionalities in motor vehicles and, more particularly, to driving assistance systems and functionalities in motor vehicles that are configured for detecting a hands-free driving situation.

BACKGROUND

A steering system of a motor vehicle serves in a known fashion to transmit rotational movement of a steering wheel (i.e., a steering element) to steer wheels of the motor vehicle. To this end, the steering wheel can be connected in a rotationally fixed fashion to a pinion of a toothed rack steering gear (e.g., a rack and pinion type steering system) by means of a steering shaft. The toothed rack is consequently displaced axially and acts on one or more wheels of the motor vehicle (e.g., via a steering linkage that is connected to one or more wheel carriers (e.g., hubs)) for enabling pivoting (i.e., steering) of the one or more wheels.

In particular, in the case of an electrically driven power steering systems (e.g., an electric power assisted steering (EPAS) system), very high torques can need to be transmitted between the pinion and the toothed rack by the toothed rack steering gear. This same situation can, of course, also apply to a hydraulic power assist steering (HPAS) system or mixed forms of steering system such as for example an electric hydraulic power assist steering (EHPAS) system. The torques which have to be transmitted between pinion and toothed rack usually increase as the steering lock increases, i.e. as the toothed rack is increasingly axially displaced from the center position in the direction of the axial end positions of the toothed rack (i.e., the steering effort increases as a function of displacement of the toothed rack).

Motor vehicles are increasingly being equipped with what are referred to as driving assistance systems or control elements. An example of such a driving assistance system is one that provides lane keeping assistance (i.e., a lane departure warning system) by helping a driver to maintaining the motor vehicle within a given lane of a roadway over which the motor vehicle is travelling. For example, the driver could be informed that the vehicle threatens to leave the lane by one or more corresponding control elements such as vibrating of the steering wheel.

It is possible with such driving assistance systems that they also influence steering provided by the steering system itself such as by, for example, steering virtually independently or automatically. In this case, the intervention can, however, be such that as far as possible the driver does not notice this. Of course, steering corrections by driving assistance systems are desirable. For example, if the driver were to take both hands off the steering wheel (i.e., a steering element which can be operated manually) during an instance of assisted steering functionality or if the driver were to only steer loosely with its his fingers during an instance of assisted steering functionality (i.e., a virtually hands-free driving situation), the driving assistance system would nevertheless carry out the respectively detected steering corrections (i.e., would steer independently). Such independent steering or such independent steering reactions to detected requests on the part of the driving assistance systems (e.g., a driving assistance system that provides for autopilot type driving assistance functionality) would go beyond what is referred to in the industry as the "steer-by-wire", which is an example of purely electrical steering. However, such autopilot types of driving assistance functionality are not permitted in certain currently valid motor vehicle operations regulations that authorize the use of motor vehicles for road traffic. Germany is one example of a country with current motor vehicle operations regulations that do not permit autopilot types of driving assistance functionality.

Therefore, detecting a hands-free driving situation in a motor vehicle would be beneficial advantageous, desirable and useful.

SUMMARY OF THE DISCLOSURE

The disclosures made herein relate to operation of driving assistance systems of motor vehicles having a power steering system. In a particular, the disclosures made herein relate to driving assistance systems that can act on a steering system of a motor vehicle, which itself can be manually activated (e.g., manually actuated/manipulated) through use of a steering element (e.g., a steering wheel). Embodiments of the inventive subject matter are based on the object of providing an approach for operating driving assistance systems in which it is possible to determine with simple means whether a hands-free driving state is present or not. The result of such determination being that a driving assistance system can be reset in their requested steering correction functionality on the basis of the respectively detected driving state (i.e., transitioning the driving assistance system from one state of operation to another).

In one embodiment of the inventive subject matter, a method comprises a plurality of operations. In conjunction with a real (i.e., actual) steering system of a motor vehicle being acted on by a driving assistance system, an operation is performed by a theoretical steering system model of the motor vehicle for generating an estimated steering system signal as a function of a first actual steering system signal representing an input action provided to the real steering system by a power steering actuating unit. An operation is then performed for comparing the estimated steering system signal with a second actual steering system signal representing an input action provided to the real steering system through a steering element of the real steering system. The real steering system is manually controllable through the steering element. Next, an operation is performed for changing a state of the driving assistance system in response to at least one defined difference existing between the estimated steering system signal and the second actual steering system signal.

In another embodiment of the inventive subject matter, a motor vehicle comprises a real steering system, a theoretical steering system model, a comparison unit, and a driver assistance system. The real steering system includes a power steering actuating unit coupled between a steering input element of the real steering system and a steering output element of the steering system. The real steering system is manually controllable through the steering element. The real steering system generates a first actual steering system signal representing an input action provided to the real steering system by the power steering actuating unit and a second actual steering system signal representing an input action provided to the real steering system through the steering element of the real steering system. The theoretical steering system model is coupled to the real steering system for generating an estimated steering system signal as a function of the first actual steering system signal. The comparison unit is coupled between the real steering system and the theoretical steering system model. The comparison unit determines when at least one defined difference existing between the estimated steering system signal and the second actual steering system signal for enabling a changing in a state of the driving assistance system to be implemented in response to at least one defined difference existing between the estimated steering system signal and the second actual steering system signal. The driver assistance system is coupled to the comparison unit. The driver assistance system is transitioned from a first operating state to a second operating state in response the comparison unit determining that the at least one defined difference existing between the estimated steering system signal and the second actual steering system signal.

Accordingly, it can be seen that a method configured in accordance with an embodiment of the inventive subject matter can therefore advantageously comprise at least the following functions: 1.) simultaneous operation of a theoretical steering system model with respect to a real steering system, 2.) picking up (i.e., acquiring) a first and a second actual steering system signal from the real steering system, 3.) feeding i.e., providing) the first actual steering system signal to the theoretical steering system model, 4.) feeding the second actual steering system signal to a comparison unit, 5.) generating the estimated steering system signal in the theoretical steering system model as a function of the first actual steering system signal, 6.) feeding the estimated steering system signal to the comparison unit, and 7.) comparing the generated estimated steering system signal with the second actual steering system signal, preferably for determining differences therebetween.

In view of the disclosures made herein, a skilled person will appreciate that embodiments of the inventive subject matter ensures that a hands-free driving situation can be detected. In the case of such detection of a hands-free driving situation, requirements of a driving assistance system are preferably reset with respect to steering corrections thereof. In this manner, virtually independent steering of the vehicle such as, for example, and autopilot type of driving assistance functionality is therefore advantageously avoided.

These and other objects, embodiments, advantages and/or distinctions of the inventive subject matter will become readily apparent upon further review of the following specification, associated drawings and appended claims.

BRIEF DESCRIPTION OF THE DRAWINGS

FIG. 1 is a schematic illustration of a motor vehicle configured in accordance with an embodiment of the inventive subject matter, wherein the motor vehicle has a real steering system to which a theoretical steering system model is coupled and is simultaneously operated.

DETAILED DESCRIPTION OF THE DRAWING FIGURES

FIG. 1 shows a real steering system 13 of a motor vehicle 100. The real steering system 13 can be configured in accordance with any number of different arrangements of known steering systems. In a preferred embodiment (shown), the real steering system 13 is implemented as a rack and pinion type of steering system that is equipped, by way of example, with an electric power steering system (EPAS), which is illustrated in simplified form as an actuator 3. The actuator 3 acts in a known fashion on a toothed rack 4 of the real steering system 13. The actuator 3 can include an EPAS motor, a transmission and corresponding electronics, which are known to this extent. A pinion. 8, which is arranged at a first end portion 6 (i.e., a foot end) of a steering shaft 6 (i.e., a pillar), meshes with the toothed rack 4. The actuator 3 includes a first sensor 17 for outputting a signal that is a function of interaction between the actuator 3 and the toothed rack 4. A steering element 5, which can be operated manually, is coupled at a second end portion of the steering shaft 6. The steering element 5 can be embodied, for example, as a steering wheel. A torsion bar sensor 7 (i.e., a second sensor of the real steering system) is provided such as, for example, arranged between the steering shaft 6 and the pinion 8. The torsion bar sensor 7 can be a torsion bar that picks up (e.g., senses) a torsion signal. For example, during steering of the real steering system 13, the torsion bar will rotate and a corresponding rotational angle is a measure of a steering moment. The underlying method of operation of the real steering system 13 with the actuator 3 is known, for which reason more detail thereon will not be given here.

The real steering system 13 has a plurality of sensors with which steering system signals can be acquired (i.e., picked up) and provided (i.e., fed), for example, to a control unit of the motor vehicle 100. The motor vehicle 100 has one or more driving assistance systems (e.g., the driving assistance system 15). The driving assistance system 15 can carry out steering corrections depending on certain requirements. Some of these steering corrections are not intended to be able to be perceived by a driver of the motor vehicle 100 (e.g., through feedback at the steering element 5). However, control elements that can alert the driver to certain situations can be provided. It is therefore possible for the driving assistance system 15 to assist the driver in keeping in the correct lane without the driver noticing a possible steering correction. A control element can, however, also alert the driver to the fact that the motor vehicle risks leaving the lane. This can be done visually, acoustically, and/or haptically, with, for example, the possibility of a haptically perceptible oscillation, for example of the steering wheel, being generated as a warning indication.

If hands of the driver where not on the steering element 5, the result of such steering corrections of the driving assist system 15 could result in a hands-free driving situation. Such a hands-free driving situation can equally arise in the sense of the inventive subject matter in the case of loose steering input at the steering element 5 (e.g., via individual fingers of the driver on the steering element 5). In such cases, the motor vehicle 100 would be controlled by means of an autopilot type of driving assistance functionality because the driving assistance system 15 would carry out independent steering movements (e.g., steering corrections) of the real steering system 13 (e.g., via a control signal 19 provided from the driving assist system 15 to the actuator 3). The inventive subject matter comes into play here in that it is detected whether a hands-free driving situation (i.e., state) is present, with the result that the driving assistance system 15 or one or more control elements of the motor vehicle 100 are reset in their steering correction functionality.

To this end, at the same time as the real steering system 13 is in operation, a theoretical steering system model 1 of the motor vehicle 100 is also in operation. The inventive subject matter is based on the theoretical steering system model 1 constituting a mathematically abstracted representation of reality (i.e., actual operating conditions of the real steering system 13). In the illustrated exemplary embodiment, a first actual steering system signal 12, which can be a position signal of the actuator 3 (e.g., from the first sensor 17 thereof), is provide to the theoretical steering system model 1. A second actual steering system signal 9, which can be a signal of the torsion bar sensor 7, is provided to a comparison unit 2 of the motor vehicle 100.

The first actual steering system signal 12 is provided to the theoretical steering system model 1 and is converted by the theoretical steering system model 1 into an estimated steering system signal 10. More specifically, the estimated steering system signal 10 can be generated as a function of the first actual steering system signal 12. In this manner, for example, the actual position signal (i.e., the first actual steering system signal 12) is generated into an estimated or expected torsion moment contribution that is represented by the estimated steering system signal 10. Accordingly, the theoretical steering system model 1 can be embodied, for example, as a spring/mass oscillator.

The estimated steering system signal 10 (e.g., an estimated torsion moment 10 or profile thereof) is provided to the comparison unit 2. The comparison unit 2 permits the comparison of the estimated steering system signal 10 and the second actual steering system signal 9 for determining if any difference exists therebetween (e.g., through checking partial or complete identities thereof). If it is detected in the comparison unit 2 that there is any difference at all between the estimated steering system signal 10 and the second actual steering system signal 9 (e.g., if it is detected that the signals are different), it can be assumed that a hands-free driving state is not present. However, if it is detected that no difference exists or has existed (e.g., can no longer be detected with the selected comparison method) between such signals, a hands-free driving situation (i.e., state) is assumed to be present. In one embodiment, the estimated steering system signal 10 and the second actual steering system signal 9 each represent or can are used to derive a respective relative identity (e.g., a qualitative characterization) thereof. Accordingly, a defined difference is present only when a relative identity exists for each one of the estimated steering system signal and the second actual steering system signal.

As previously mentioned, the inventive subject matter is based on the theoretical steering system model 1 constituting a mathematically abstracted representation of reality (i.e., actual operating conditions of the real steering system 13). Accordingly, even real or estimated or calculated signals may not always be absolutely identical. Instead, however, the comparison signals 9,10 (i.e., the estimated steering system signal 10 and the second actual steering system signal 9) have differences that are to a certain extent mathematically negligible. Even though such differences are mathematically negligible, the comparison signals 9,10 can define respective signal identities whereby a difference in the comparison signals is characterized as each having a relative identity.

However, it is also conceivable that in the comparison unit 2 a limiting difference is stored in order to be able to still predict a hands-free driving state if the relative identity can no longer be detected but a hands-free driving state should appropriately be predicted. The limiting difference can correspond here to the mathematically negligible limiting difference or can differ in an upward (e.g., increasing) direction. The mathematically negligible limiting difference value, which is the mathematically negligible one in the particular case, is defined as the lowest value of the limiting difference. If a relatively large difference is detected between the comparison signals 9,10 in the comparison unit 2, which difference is greater than the mathematically negligible difference but within a predefined limiting difference, it is also possible to predict a hands-free driving state. However, if a relatively large difference between the comparison signals 9, 10 is detected in the comparison unit 2 and the difference is also outside the predefined limiting difference (i.e., larger than the mathematically negligible limiting difference), a hands-free driving state therefore cannot be determined to exist (i.e., predicted). If the difference that is found is equal to the limiting difference but not the same as the mathematically negligible limiting difference, this case may advantageously be assigned to one of the two cases of a hands-free driving state or driver-steered driving state.

The comparison unit 2 generates a signal indicating a hands-free driving state (i.e., the hands-free driving state signal 11 as a result of the comparison operation) in response to a difference being detected between the comparison signals 9,10. The hands-free driving state signal 11 is provided to, for example, a control unit which forms closed-loop or open-loop control of the function of the driving assistance system 15, one or more other driving assistance systems, and/or control elements thereof. The hands-free driving state signal 11 is provided in this manner for causing a state of operation of at least one driving assistance system (e.g., the driving assistance system 15) to be transitioned from a first state of operation to a second state of operation (i.e., to a different operating state). For example, in the case of a hands-free driving state being detected, functionality of the driving assistance system 15 can be altered (e.g., deactivated) until the hands-free driving state is cancelled (e.g., by altering the control signal 19 provided from the driving assistance system 15 to the actuator 3). To this extent, it is advantageous if the theoretical steering system model 1 and associated comparison unit 2 are continuously operated simultaneously with (i.e., in parallel with) operation of the real steering system 13. The result of such continuous and simultaneous operation is that the comparison signals 9,10 can be continuously checked whether a hands-free driving state is present or not, in order to therefore perform open-loop or closed-loop control of the method of functioning of a driving assistance system of the motor vehicle 100 (e.g., the driving assistance system 15). It is disclosed herein that, alternatively, the hands-free driving state signal 11 can be generated by the driving assistance system 15 as a function of information provided thereto by the comparison unit 2.

As previous disclosed, a real power steering system of a motor vehicle configured in accordance with the inventive subject matter can be embodied as an electric power steering (EPAS) system, which is, of course, not intended to be restrictive. In view of the disclosures made herein, a skilled person will appreciate that the real power steering system can be implemented in accordance with another type of known power steering assist approach (e.g., HPAS, EHPAS, etc). It is advantageous within the sense of the inventive subject matter if a position signal of an actuator of the power steering system is picked up as a first actual steering system signal. The actuator can, for example, can be formed as a unit comprising an EPAS motor, the transmission thereof and the associated electronics, which are well known, for which reason more details thereon will not be given here. This position signal can be passed onto the theoretical steering system model. It is also advantageous if an actual torque signal can be picked up from a torsion bar sensor as the second actual steering system signal. The torsion bar sensor can preferably be arranged on a steering column in the region of a pinion which transmits to a toothed rack and its function is well known, for which reason more details will also not be given thereon here. It is apparent of a skilled person that the inventive subject matter makes use of the picking up or evaluation of signals which are present or can be tapped in any case, wherein it is possible largely or completely to dispense with cost-intensive implementation of external sensors. To this extent, the signals that can be picked up and evaluated, which are mentioned by way of example, are also not restricted to the signals.

It is important that by means of a theoretical steering system model configured in accordance with an embodiment of the inventive subject matter, an estimated steering system signal is generated as a function of an actual steering system signal that represents an input action provided to the real steering system by a power steering actuating unit. For this purpose, corresponding routines are stored in the theoretical steering system model. Such a routine can be, for example, the numerical or analytical model of a dynamic spring/mass oscillator. In such a model, the spring reflects a torsion bar of the real steering system (e.g., a torsion bar sensor) and the torsional mass reflects a steering element (e.g., steering wheel and/or steering column associated therewith). Because a positional excitation of the spring in the model takes place at its open end, it is also possible to speak of this model as a foot-point-excited steering system model. With this foot-point-excited steering system model, it is therefore possible to determine a profile of the estimated steering system signal, specifically advantageously at the same time as that of the actual second actual steering system signal. The illustrated case of the single-mass oscillator model is to be seen merely as a very simple example. More complex modeling structures, for example with more degrees of freedom taking into account the dissipative variables (damping, friction) etc. are also conceivable and contemplated herein.

If the second actual steering system signal is, for example, the torsion moment which is picked up by the torsion bar sensor, the estimated (i.e., expected) torsion moment that corresponds thereto can be generated in the foot-point-excited steering system model. The estimated torsion moment, which is calculated within the theoretical steering system model, is provided to the comparison unit, to which the measured or actual torsion moment (i.e., the second actual steering system signal) is also provided. The comparison unit permits the signals provided thereto to be checked for partial or complete identity. The comparison can be carried out in the time domain or in the frequency domain. The comparison can relate, for example, to instantaneous values but also to profiles, fixed or sliding signal sections or derived variables of the two comparison variables. Within the time domain, an amplitude comparison of the signals is particularly appropriate. In the frequency domain, for example FFT (Fast Fourier Transformation), coefficients can be advantageously compared. The amplitude profile and phase position of the signals provided to the comparison unit can also be advantageously used for the comparison. It can be particularly suitable to carry out a correlation analysis or else a statistical analysis of the signals provided to the comparison unit. The methods specified here for comparing the two moment signals from the calculated steering system model and the measured steering system are to be understood as presented herein for exemplary purposes.

In the preceding detailed description, reference has been made to the accompanying drawings that form a part hereof, and in which are shown by way of illustration specific embodiments in which the inventive subject matter may be practiced. These embodiments, and certain variants thereof, have been described in sufficient detail to enable those skilled in the art to practice embodiments of the inventive subject matter. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method, comprising:

In conjunction with a real steering system of a motor vehicle being acted on by a driving assistance system, a theoretical steering system model of the motor vehicle generating an estimated steering system signal as a function of a first actual steering system signal representing an input action provided to the real steering system by a power steering actuating unit;

providing the first actual steering system signal as a position signal of the power steering actuating unit to the theoretical steering system model;

acquiring a second actual steering system signal from the real steering system:

providing the second actual steering system signal as a position signal of the power steering actuating unit to a comparison unit;

providing the estimated steering system signal to the comparison unit;

wherein the theoretical steering system model is in simultaneous operation with respect to the real steering system;

comparing the estimated steering system signal with the second actual steering system signal representing an input action provided to the real steering system through a steering element of the real steering system for determining the at least one defined difference, wherein the real steering system is manually controllable through the steering element;

generating a signal indicating a hands-free driving state in response to the comparing determining that the at least one defined difference exists between the estimated steering system signal and the second actual steering system signal;

providing the hands-free driving state indicating signal to the driving assistance system; and changing a state of the driving assistance system from active to inactive in response to the hands-free driving state indicating signal.

2. The method of claim 1 wherein the at least one defined difference is present only when a relative identity exists for each one of the estimated steering system signal and the second actual steering system signal.

3. The method of claim 1 wherein a position signal of the power steering actuating unit is the first actual steering system signal.

4. The method of claim 3 wherein a torque signal of a torsion bar sensor of the real steering system is the second actual steering system signal.

5. The method of claim 1 wherein a torque signal of a torsion bar sensor of the real steering system is the second actual steering system signal.

6. The method of claim 1, further comprising:
generating a signal indicating a hands-free driving state in response to the comparing determining that the at least one defined difference exists between the estimated steering system signal and the second actual steering system signal; and
providing the hands-free driving state indicating signal to the driving assistance system.

7. The method of claim 1, further comprising:
generating a signal indicating a hands-free driving state in response to the comparing determining that a relative identity exists for each one of the estimated steering system signal and the second actual steering system signal; and
providing the hands-free driving state indicating signal to the driving assistance system.

8. A steering system for a motor vehicle, comprising:
a real steering system including a power steering actuating unit coupled between a steering input element of the real steering system and a steering output element of the steering system, wherein the real steering system is manually controllable through the steering element, and wherein the real steering system generates a first actual steering system signal representing an input action provided to the real steering system by the power steering actuating unit and a second actual steering system signal representing an input action provided to the real steering system through the steering element of the real steering system;
a theoretical steering system model coupled to the real steering system for generating an estimated steering system signal as a function of the first actual steering system signal,
a comparison unit coupled between the real steering system and the theoretical steering system model, wherein the comparison unit determines when at least one defined difference existing between the estimated steering system signal and the second actual steering system signal for enabling a changing in a state of the driving assistance system in response to at least one defined difference existing between the estimated steering system signal and the second actual steering system signal, the comparison unit generates a signal indicating a hands-free driving state in response to the comparison unit determining that a relative identity exists for each one of the estimated steering system signal and the second actual steering system signal, the comparison unit provides the hands-free driving state indicating signal to the driving assistance system; and
a driving assistance system coupled to the comparison unit, wherein the driving assistance system is transitioned from a an active driving assistance state to an inactive driving assistance state in response the hands-free driving state indicating signal.

9. The steering system for a motor vehicle of claim 8 wherein the at least one defined difference is present only when a relative identity exists for each one of the estimated steering system signal and the second actual steering system signal.

10. The steering system for a motor vehicle of claim 8 wherein the theoretical steering system model is in simultaneous operation with respect to the real steering system.

11. The steering system for a motor vehicle of claim 8 wherein one of the comparison unit and the driver assistance system generates a signal indicating a hands-free driving state in response to the comparison unit determining that the at least one defined difference exists between the estimated steering system signal and the second actual steering system signal.

12. The steering system for a motor vehicle of claim 11 wherein the comparison unit generates the hands-free driving state indicating signal and providing the hands-free driving state indicating signal to the driving assistance system.

13. The steering system for a motor vehicle of claim 8 wherein:
a position signal of the power steering actuating unit is the first actual steering system signal; and
a torque signal of a torsion bar sensor of the real steering system is the second actual steering system signal.

14. The steering system for a motor vehicle of claim 13 wherein the at least one defined difference is present only when a relative identity exists for each one of the estimated steering system signal and the second actual steering system signal.

15. The steering system for a motor vehicle of claim 14 wherein the theoretical steering system model is in simultaneous operation with respect to the real steering system.

* * * * *